(No Model.)
E. W. MERRILL.
COUPLING FOR ROPES AND ROUND BANDS.
No. 258,241. Patented May 23, 1882.
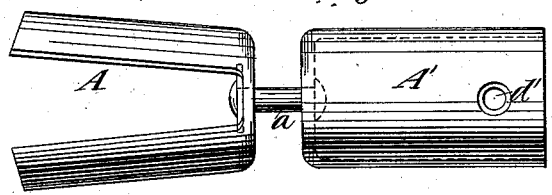
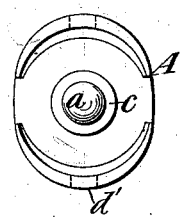
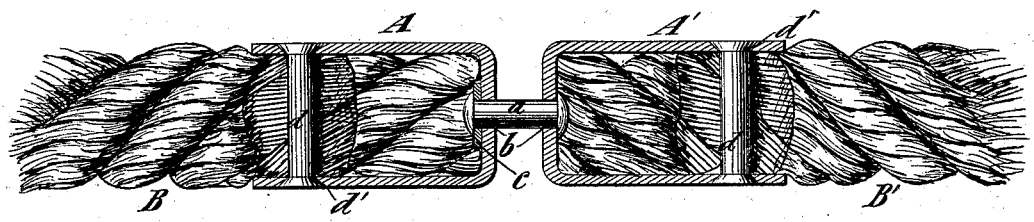
WITNESSES
INVENTOR

UNITED STATES PATENT OFFICE.

EDWARD W. MERRILL, OF BROOKLYN, NEW YORK.

COUPLING FOR ROPES AND ROUND BANDS.

SPECIFICATION forming part of Letters Patent No. 258,241, dated May 23, 1882.

Application filed September 16, 1881. (No model.)

*To all whom it may concern:*

Be it known that I, EDWARD W. MERRILL, of Brooklyn, in the county of Kings and State of New York, have invented a certain new and useful Improvement in Couplings for Ropes and Round Bands, of which the following is a specification.

My invention particularly relates to couplings for ropes such as are used in hoisting apparatus and for other purposes, and the two ends of which are commonly united by splicing to form endless ropes. Ropes which are exposed to atmospheric changes are liable to twist up or untwist with changes in the weather, and when spliced such twisting up or untwisting is apt to produce kinks in the rope. Where the rope is used to run over a grooved pulley or sheave it is also difficult to make a splice which will properly fit the groove in said pulley or sheave.

The object of my invention is to provide a coupling which will permit the two ends of a rope to turn or twist independently of each other, and which is of the same, or nearly the same, size as the rope itself.

To this end the invention consists in a coupling for ropes and bands, composed of two sockets swiveled together and each comprising two semi-cylindric jaws, between which the end of the rope or band is directly inserted, and rivets or other devices inserted transversely through said jaws for drawing them together and clamping them upon the rope or band, as more fully hereinafter described.

In the accompanying drawings, Figure 1 represents a side view of a coupling embodying my invention. Fig. 2 represents an end view thereof, and Fig. 3 represents a longitudinal section of the coupling and two end portions of rope united thereby.

Similar letters of reference designate corresponding parts in all the figures.

A A' designate the two sockets of my coupling, and $a$ designates a rivet, which is inserted through holes $b$ in the end of each socket and then riveted, so as to hold the two sockets together. The rivet $a$ forms a swiveling connection between the two sockets, and allows them to turn in either direction independently of each other. As here shown, a washer, $c$, is placed upon one end of the rivet, which prevents the rivet from being swelled in riveting so as to fix it rigidly in the socket. Each socket A A' is composed of two semi-cylindric jaws, as seen clearly in Fig. 1, which represents one socket, A, with the edges of the jaws in view, and the other socket, A', with the back of one of the jaws in view. When made the two jaws are slightly divergent, as seen in socket A, Fig. 1, so that the end of the rope or band may be readily inserted directly between said jaws, and after the rope or band is thus inserted the two jaws are drawn toward each other and clamped around the rope or band, forming a nearly-continuous cylindric socket.

B B' designate the two end portions of a rope which are united by my coupling. The ends B B' are inserted into the sockets A A', which are then clamped upon them and held by rivets $d$, inserted transversely through holes $d'$ in the two jaws and through the rope or band. The rivets $d$ are riveted down flush with the periphery of the sockets, and it will be observed that the sockets themselves are of the same, or nearly the same, size as the rope, and therefore will fit properly in any grooved pulley or sheave to which the rope is adapted. The swiveling connection of the two sockets enables the rope to twist up or untwist with changes in the weather without liability of kinking.

What I claim as my invention, and desire to secure by Letters Patent, is—

The coupling for ropes and bands, composed of two sockets swiveled together and each comprising two semi-cylindric jaws, between which the end of the rope or band is directly inserted, and rivets or other devices inserted transversely through said jaws for drawing them together and clamping them upon the rope or band, substantially as specified.

EDWD. W. MERRILL.

Witnesses:
  FREDK. HAYNES,
  ED. MORAN.